(12) United States Patent
Ohashi et al.

(10) Patent No.: US 6,194,068 B1
(45) Date of Patent: *Feb. 27, 2001

(54) WIRE FOR WIRE SAW APPARATUS

(75) Inventors: Seishiro Ohashi; Shinichi Okada; Kenji Asano; Kazunori Suzuki; Masahiro Sakamoto, all of Ibaraki (JP)

(73) Assignee: Hitachi Cable Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/966,126

(22) Filed: Nov. 7, 1997

(30) Foreign Application Priority Data

Nov. 11, 1996 (JP) .................................................. 8-311187
Nov. 25, 1996 (JP) .................................................. 8-328004

(51) Int. Cl.[7] .................................................. B32B 15/00
(52) U.S. Cl. .......................... 428/379; 428/361; 428/364; 428/367; 428/368; 428/372; 428/375; 428/381; 428/389; 427/201; 427/205; 427/249; 427/255; 427/405

(58) Field of Search .................................. 428/368, 380, 428/389, 372, 366, 379, 384, 390, 357, 361, 364, 367, 375, 381; 427/248 R, 201, 205, 249, 405, 255, 206, 455, 404

(56) References Cited

U.S. PATENT DOCUMENTS

| 4,055,700 | * | 10/1977 | Ronnquist et al. . |
| 4,139,659 | * | 2/1979 | Ronnquest et al. .................. 427/249 |
| 4,964,209 | * | 10/1990 | Murai et al. ............................ 29/527 |
| 5,551,960 | * | 9/1996 | Christianson ........................ 51/295 |

* cited by examiner

Primary Examiner—Merrick Dixon
(74) Attorney, Agent, or Firm—McDermott, Will & Emery

(57) ABSTRACT

A wire for a wire saw apparatus for slicing a material includes an element wire, a binder coated on an outside circumferential surface of the element wire, and abrasive grains dispersed in the binder. The element wire is a high tensile strength metal wire, the binder is a material such as an organic or inorganic material other than a metal, and the abrasive grains are held on a surface of the element wire by the binder. The element wire is also made by either a natural quartz glass or a high purity synthesis quartz glass.

10 Claims, 6 Drawing Sheets

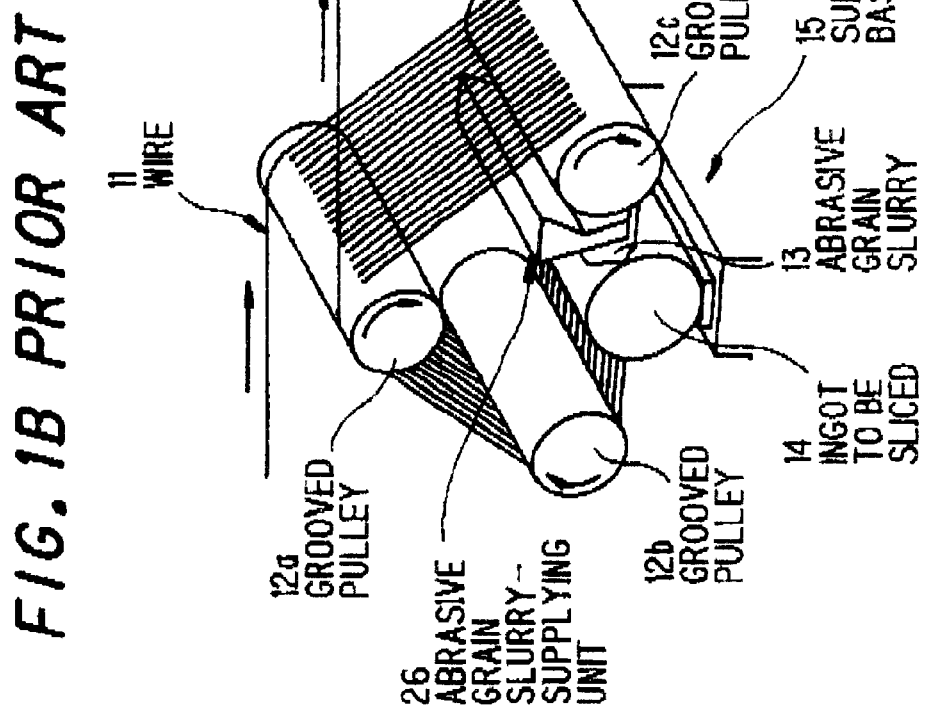
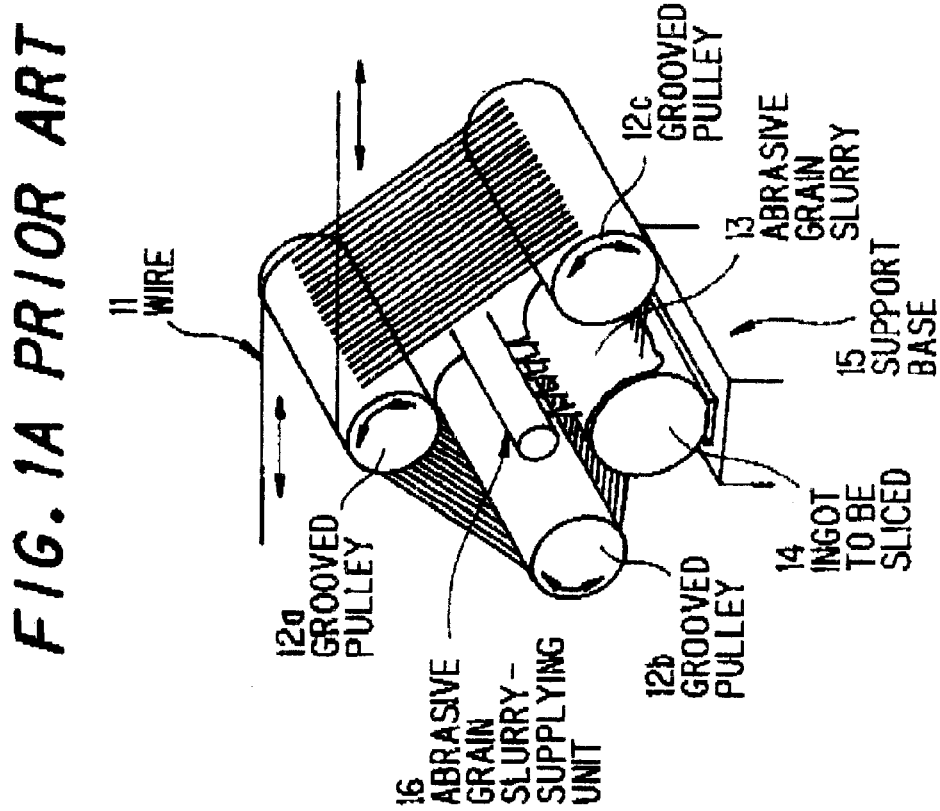

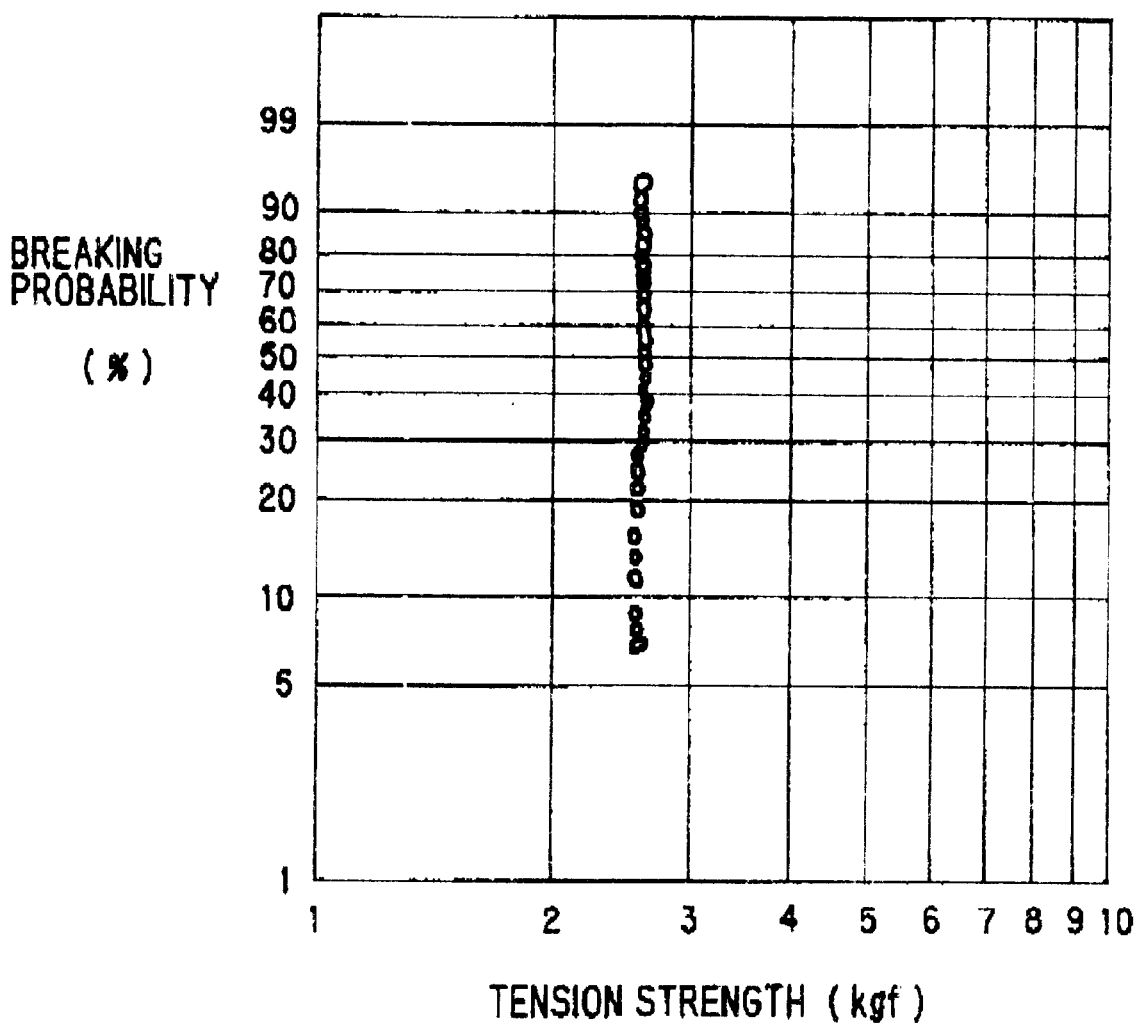

WIRE FOR WIRE SAW APPARATUS

FIELD OF THE INVENTION

The invention relates to a wire for a wire saw apparatus, and more particularly to, a wire for a wire saw apparatus used to slice materials (ingot) such as a semiconductor silicon ingot, a compound semiconductor ingot, a magnetic material, a quartz, etc.

BACKGROUND OF THE INVENTION

Conventionally, an inner diameter blade slicer, a wire saw, and partly an outer diameter blade slicer are used to cut a mother material in preparing a wafer or a chip as a semiconductor material and an electronic material.

Recently, though an outer diameter of a silicon wafer becomes greater, a technical limit of the outer diameter of the silicon wafer which can be sliced by the inner diameter blade slicer is at 8 inches, and it may be at 6 inches in an aspect of profitability in production.

In comparison with the inner and outer diameter blade slicers, the wire saw can slice a semiconductor ingot to provide a number of wafers, for instance, more than 50 wafers in a case, at one time, so that a through-put is expected to be high in the usage of the wire saw. For this reason, it has been widely used, and it is expected that the wafers will be manufactured by using the wire saw, when a semiconductor ingot having a diameter of 12 inches which will be presumably used with a large quantity in the future will be adopted.

In a wire saw apparatus, generally, a loose abrasive grain slurry-injecting method, in which a piano wire runs in pressure contact with an ingot, and cutting oil ("abrasive grain slurry" hereinafter) consisting of lubricating oil and abrasive grains dispersed therein is injected in contact portions between the piano wire and the ingot, is used.

A reciprocating type of a conventional wire saw apparatus comprises three grooved pulleys each of which has grooves on its outer surface, a wire, wound over the grooved pulleys to run through the grooves of the grooved pulleys, for slicing an ingot to provide wafers, a support base for placing the ingot to be sliced thereon, and an abrasive grain slurry-supplying unit, placed in a triangle space region defined by the three grooved pulleys, for supplying a surface of the ingot with an abrasive grain slurry.

The wire is forced to run in pressure contact with the ingot in the directions of right and left, while the abrasive grain slurry-supplying unit supplies the surface of the ingot with the abrasive grain slurry. Thus, the ingot is sliced to provide a number of wafers at one time by the wire.

Similar to the reciprocating type of the wire saw apparatus, a one-way type of a conventional wire saw apparatus comprises three grooved pulleys each of which has grooves on its outer surface, a wire, wound over the grooved pulleys to run through the grooves of the grooved pulleys, for slicing an ingot to provide wafers, a support base for placing the ingot to be sliced thereon, and an abrasive grain slurry-supplying unit, placed at a position immediately before the wire slices the ingot, for supplying a surface of the ingot with an abrasive grain slurry.

The wire is forced to run in pressure contact with the ingot in one direction right or left, while the abrasive grain slurry-supplying unit supplies the surface of the ingot with the abrasive grain slurry. Thus, the ingot is sliced to provide a number of wafers at one time by the wire.

In the conventional wire saw apparatus, the wire needs having a high tensile strength, because the wire has to be tensed during slicing the ingot to provide the wafers. Therefore, a piano wire, an expensive special alloyed steel wire, a ultra-high strength alloyed wire made in accordance with the adjustment of a metallic crystal structure (disclosed in the Japanese Patent Kokai No. 01-222814), an amorphous alloyed wire, etc. are used for the wire for the wire saw apparatus.

Currently, in the wafers sliced by these wires, a yield of the wafers must be improved in accordance with the decrease of kerf loss to lower production cost. For this purpose, a diameter of the wire must be small to decrease the kerf loss.

Thus, various studies in which the diameter of a conventional wire having the diameter of about 0.16 mm is made small are carried out. At the same time, it is desired that a tensile strength of the wire is increased.

In the conventional wire saw apparatus using the loose abrasive grain slurry, however, there are disadvantages in that a slicing performance is low, because the bite of the abrasive grain slurry into the slicing area of the wire saw is instable, and the yield of the wafers and production performance are decreased in a polishing process following the process of slicing an ingot, because a flaw or defect, what is called "saw mark", is occurred by an instantaneous or partial lack of the abrasive grain slurry.

In the conventional abrasive grain slurry-injecting method, a variety of improvements are executed to increase the production performance, because the bits of the abrasive grain slurry into the wire saw is instable and not effectual. For instance, the variety of improvements are to use:

(1) an element wire which consists of a single metal wire or a stranded wire, having a helical groove formed on its surface [disclosed in the Japanese Utility Model Filing No. 60-21620 (the Japanese Utility Model Kokai No. 61-137421)]; and (2) A WIREMOND (trademark) which is a diamond saw wire made from a piano wire or a stainless steel wire whose surface layer has been firmly embedded with diamond abrasive grains or SiC abrasive grains by bonding a metal such as melting or plating a metal (disclosed in Sumitomo Electric Report No. 132, 1988, March, pages 118 to 122).

In the conventional abrasive grain slurry-injecting method, however, the helically grooved element wire has a disadvantage in that the occurrence of the "saw mark" can not be prevented perfectly, because the abrasive grain is loose in the slurry.

Further, the WIREMOND has disadvantages in that it is very expensive and not widely used for the industrial purpose, because its production process is very complicated. Though the WIREMOND is formed into a ring wire, what is called "endless wire", by connecting its both ends to evade a problem that the production cost is high, the WIREMOND has disadvantages in that a strength of its connected end portion is not enough, and means of guiding it in the wire saw apparatus are easily worn, because an abrasive grain effect is too high.

SUMMARY OF THE INVENTION

Accordingly, it is an object of the invention to provide a wire for a wire saw apparatus in which a slicing yield and a slicing performance are increased and a price is low.

It is another object of the invention to provide a wire for a wire saw apparatus in which its tensile strength is large.

According to the first feature of the invention, a wire for a wire saw apparatus for slicing a material comprises an element wire, a binder coated on an outside circumferential surface of the element wire, and abrasive grains dispersed in the binder, wherein the element wire is a high tensile strength metal wire, the binder is an organic or inorganic material other than a metal, and the abrasive grains are held on the surface of the element wire by the binder.

According to the second feature of the invention, a wire for a wire saw apparatus for slicing a material comprises an element wire made by a natural quartz glass or a high purity synthesis quartz glass.

BRIEF DESCRIPTION OF THE DRAWINGS

The invention will be described in more detail in conjunction with the accompanying drawings, wherein:

FIG. 1A is a perspective view of a reciprocating type of a conventional wire saw apparatus;

FIG. 1B is a perspective view of an one-way type of a conventional wire saw apparatus;

FIG. 6 is a graph of results of a Weibull characteristic appreciation of a wire having no abrasive grain for a wire saw apparatus of the present invention;

DETAILED DESCRIPTION OF THE PREFERRED EMBODIMENTS

Figure 2:
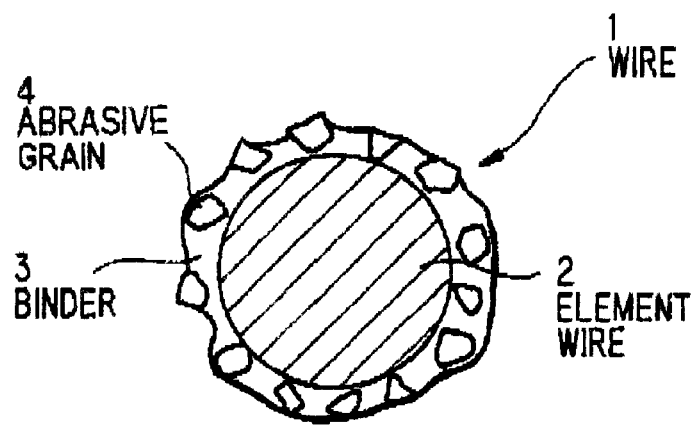
FIG. 2 is a transverse sectional view of a wire for wire saw apparatus in the first preferred embodiment of the present invention.

Before explaining a wire for a wire saw apparatus in the preferred embodiment according to the invention, the above mentioned conventional wire saw apparatus will be explained in FIGS. 1A and 1B.

In FIG. 1A, a reciprocating type of a conventional wire saw apparatus comprises three grooved pulleys 12a, 12b and 12c each of which has grooves on its outer surface, a wire 11, wound over the grooved pulleys to run through the grooves of the grooved pulleys 12a, 12b and 12c, for slicing an ingot 14 to provide wafers, a support base 15 for placing the ingot 14 to be sliced thereon, and an abrasive grain slurry-supplying unit 16, placed in a triangle space region defined by the three grooved pulleys 12a, 12b and 12c, for supplying a surface of the ingot 14 with an abrasive grain slurry 13.

The wire 11 is forced to run in pressure contact with the ingot 14 in the directions of right and left, while the abrasive grain slurry-supplying unit 16 supplies the surface of the ingot 14 with the abrasive grain slurry 13. Thus, the ingot 14 is sliced to provide a number of wafers at one time by the wire 11.

In FIG. 1B, a one-way type of a conventional wire saw apparatus comprises three grooved pulleys 12a, 12b and 12c each of which has grooves on its outer surface, a wire 11, wound over the grooved pulleys to run through the grooves of the grooved pulleys 12a, 12b and 12c, for slicing an ingot 14 to provide wafers, a support base 15 for placing the ingot 14 to be sliced thereon, and an abrasive grain slurry-supplying unit 26, placed at a position immediately before the wire 11 slices the ingot 14, for supplying a surface of the ingot 14 with an abrasive grain slurry 13.

The wire 11 is forced to run in pressure contact with the ingot 14 in one direction of right or left, while the abrasive grain slurry-supplying unit 26 supplies the surface of the ingot 14 with the abrasive grain slurry 13. Thus, the ingot 14 is sliced to provide a number of wafers at one time by the wire 11.

In the above conventional wire saw apparatus, the wire 11 needs having a high tensile strength, because the wire 11 has to be tensed during slicing the ingot 14 to provide the wafers. Therefore, a piano wire, an expensive special alloyed steel wire, a ultra-high strength alloyed wire made in accordance with the adjustment of a metallic crystal structure (disclosed in the Japanese Patent Kokai No. 01-222814), an amorphous alloyed wire, etc. are used for the wire 11 for the conventional wire saw apparatus.

Next, a wire for a wire saw apparatus in the first preferred embodiment according to the invention will be explained in FIGS. 2 to 4.

In FIG. 2, a wire 1 for a wire saw apparatus comprises an element wire 2, a binder 3 coated on an outside circumferential surface of the element wire 2, and abrasive grains 4 dispersed in the binder 3.

The element wire 2 is a high tensile strength metal wire, for instance, one of a brass-plating piano wire, a special alloyed steel wire, a ultra-high strength alloyed wire, etc.

The binder 3 is any material other than a metal, for instance, an inorganic material such as a glass, an organic material such as a polyamide-imide resin, etc.

The abrasive grains 4 are of, for instance, GC, alumina, silicon carbide, etc.

Next, a method for producing the wire 1 for the wire saw apparatus will be explained.

During mixing a solution made by solving a binder comprising a polyamide-imide resin into a solvent, the GC of #2,000 are dispersed in the solution. The abrasive grains-dispersed solution is coated on an outer surface of the brass-plating piano wire having a diameter of 0.16 mm. Then, the element wire coated with the abrasive grains-dispersed solution is baked through a heating furnace, so that the wire for the wire saw apparatus is produced.

The solvent is, for instance, dimethylphenol.

In the wire 1 for the wire saw apparatus of the present invention, the solvent evaporates and dose not exist on the outer surface of the wire 1 for the wire saw apparatus, because the element wire 2 coated with the abrasive grains-dispersed solution made by solving the binder 3 into the solvent is baked. Thus, the binder 3 which is a very thin film is formed on the outer surface of the wire 1 for the wire saw apparatus. Parts of the abrasive grains 4 are exposed from the surface of the binder 3.

In a loose abrasive grain wafer slice method, even if an instantaneous or partial lack of the abrasive grain slurry is occurred between the wire 1 for the wire saw apparatus and an ingot (called "work" hereinafter), the saw mark is not occurred, because the abrasive grains are held on the surface of the wire 1 for the wire saw apparatus.

Namely, in comparison with the conventional wire for the wire saw apparatus, the bit of the abrasive grains into the ingot to be sliced is largely increased and the slicing performance is improved, because the abrasive grains 4 on its outer surface of the wire 1 for the wire saw apparatus of the present invention and the abrasive grains in the abrasive grain slurry are effective for slicing the work.

Further, the wire 1 for wire saw apparatus of the present invention is able to slice the ingot effectively to provide the wafers even where a tension of the wire 1 is set to be weaker than that of the conventional wire, because the bite of the abrasive grains is good. Thus, a diameter of the wire can be smaller than that of the conventional wire, because the tensile strength may be weak. Therefore, the yield of the wafers is increased by decreasing the kerf loss of the wafer in accordance with the decrease of the diameter of the wire 1.

Even further, some of the works are able to be sliced dependently on their materials without using the abrasive grain slurry by only lubricating oil which has no abrasive grain. Thus, the process of the wafer slice can be simple, and a dirty process can be largely improved in the environmental hygiene, because production, maintenance and management of the abrasive grain slurry are not needed or largely decreased.

The bonding force of the binder 3 and the abrasive grains 4 can be changed by selecting the material of the binder 3. In a general grindstone, for instance, either a hard grindstone or a soft grindstone can be selected. Further, the best slicing condition can be obtained by selecting a size of the abrasive grains 4 in accordance with the material of the work to be sliced, the slicing purpose, and/or the slicing condition regarding the speed, the surface roughness, etc. of slicing.

In the wire 1 for the wire saw apparatus, the element wire 2 may be a non-metallic fiber, a non-metallic fiber bunch, or a non-metallic stranded wire thereof having a high tensile strength.

The non-metallic fiber of the high tensile strength is one selected from, for instance, a carbon fiber, a polyaramide fiber, etc.

The non-metallic wire for the wire saw apparatus provides the same advantages as the metallic wire 1 for the wire saw apparatus in the first preferred embodiment. The material of the element wire 2 is determined dependently on the material of a work to be sliced, the purpose of slicing the work, the condition of slicing the work, etc.

Figure 3:
FIG. 3 is a photograph of a surface of a wire for a wire saw apparatus of the present invention observed by a scanning electron microscope.

FIG. 3 is a photograph of a surface of the wire for the wire saw apparatus in the first preferred embodiment observed by a scanning electron microscope. The microscope in FIG. 3 has a magnification of 500 times, and one scale in FIG. 3 is 6 $\mu$m.

As shown in FIG. 3, though the outer surface of the wire for the wire saw apparatus is coated with the binder, parts of the GC are exposed from the surface of the binder.

The wire for the wire saw apparatus of the first preferred embodiment is set on a widely used wire saw apparatus, then a gallium arsenic compound semiconductor ingot having the diameter of 100 mm is sliced to provide 30 wafers at one time with only lubricating oil by the wire. In this case, a design value in thickness of the wafer is 2 mm.

The result is that a time of completing the slice of the 30 wafers is 50 to 70% of a time for operation in which a conventional wire is used with injecting the abrasive grain slurry. Thus, it is confirmed that slicing performance is increased in the invention.

Figure 4:
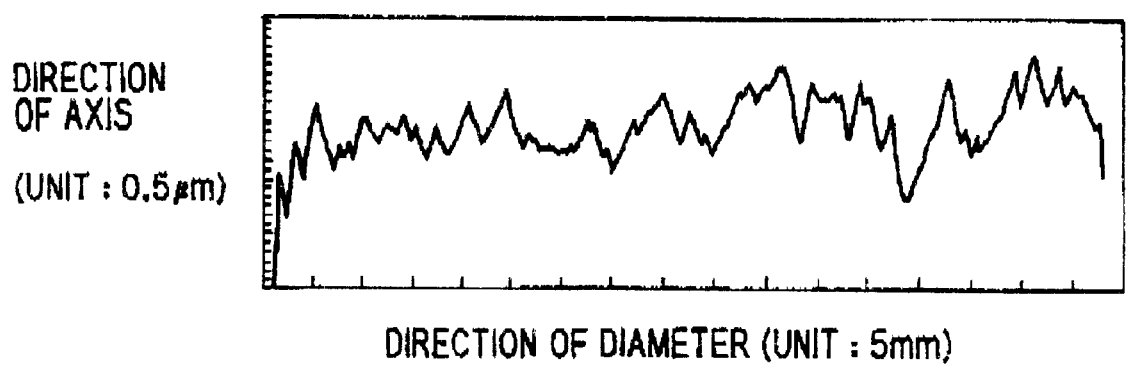
FIG. 4 is a graph of results of measuring a surface roughness of a part of a transverse cross section of a wafer which is sliced by a wire for a wire saw apparatus of the present invention by a roughness measuring unit.

FIG. 4 is a graph of results of measuring a surface roughness of a part of a transverse cross section of the wafer which is sliced by the wire for the wire saw apparatus of the present invention. The surface roughness is measured by a roughness measuring unit. The ordinate shows positions in the direction of the axis of the wafer, that is, the height of the surface of the wafer (one scale is 0.5 $\mu$m), and the abscissa shows positions in the direction of the diameter of the wafer (one scale is 5 mm).

As shown in FIG. 4, though the maximum surface roughness of a part of the transverse cross section of the wafer is about 8 to 10 $\mu$m, the surface roughness can be more improved by optimizing a size of the abrasive grains and the process condition.

That is, the wafer slice operating time and the surface roughness of the transverse cross section of the wafer can be more improved by combining optimum conditions of the size and quantity of the abrasive grains, the material of the binder, the slice operating condition, and/or the material of the work.

Next, a wire for a wire saw apparatus in the second preferred embodiment according to the invention will be explained.

Figure 5A:
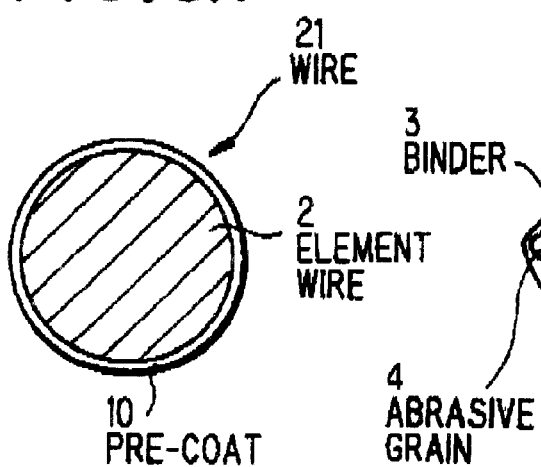
FIG. 5A is a transverse sectional view of a wire for a wire saw apparatus in the second preferred embodiment of the present invention.

In FIG. 5A, a wire 21 having no abrasive grain for a wire saw apparatus comprises an element wire 2 which is a quartz glass, and a very thin coating layer (called "pre-coat" hereinafter) 10 coated on an outside circumferential surface of the element wire 2.

The material of the element wire 2 is a quartz glass used for an optical fiber and a light guide, for instance, made by a natural quartz, or a synthesis quartz glass. In this case, a trace element dope used for a communication optical fiber to adjust a refractive index is not needed.

The element wire 2 may have an optimum diameter of 50 to 200 $\mu$m. The tensile strength of the element wire 2 which is the quartz glass having the diameter of 50 to 200 $\mu$m is 4,000 to 4,800 N/mm$^2$. The tensile strength of the element wire 2 is larger than that ranging 2,000 to 3,500 N/mm$^2$ of a general piano wire having a diameter of 80 $\mu$m.

The pre-coat 10 is made by a metal, an organic material, an inorganic material, or the combination of two or more materials selected from these materials for preventing a micro-crack from growing on the outer surface of the quartz glass element wire 2.

The material of the element wire 2 may be a pyrex grass (a heat-resisting glass), or a poly-ingredient glass, because the wire 21 having no abrasive grain for the wire saw apparatus dose not need having a high tensile strength. In this case, the cost of the wire 21 is more inexpensive.

Though it is needed that the wire 21 having no abrasive grain for the wire saw apparatus is longer than a usual length, the wire 21 of a high tensile strength having no defect therein is obtained by using, for instance, the synthesis quartz glass made by silicon tetrachloride (SiCl$_4$) having the purity of 99.9999% (6N) as the element wire 2.

Next, a method for producing the wire 21 for the wire saw apparatus will be explained.

A quartz glass ingot, especially, a high purity quartz glass ingot is heated to be melted, and the molten quartz glass is spun to be a thin wire having a diameter of 0.1 to 0.2 mm which is used for an element wire 2. The element wire 2 is coated with a pre-coat 10 at a pre-coat stage which is in tandem with a spinning stage.

Next, another method for producing the wires 21 for the wire saw apparatus will be explained.

During vaporizing silicon tetrachloride ($SiCl_4$) having the purity of 99.999% (5N), it is reacted chemically in an oxyhydrogen burner fire. Then, a porous $SiO_2$ simplex is produced by the vapor-phase axial deposition (VAD).

The porous $SiO_2$ is passed through an electric furnace to be heated and sintered, so that vitrification occurs and a synthesis quartz glass having a diameter of 30 mm is produced.

Next, the element wire having a diameter of 80 $\mu$m is formed from the synthesis quartz glass at 1,980° C. in inert gas in the electric furnace by the fiber forming process (spinning of glass). Then, a Ni layer (pre-coat) having an average thickness of 5 $\mu$m is formed on a circumferential surface of the element wire 2 which is passed through a molten Ni bath, so that the wire 21 having no abrasive grain for the wire saw apparatus is provided to have an outer diameter of 90 $\mu$m and a length of 30 km.

In the wire 21 having no abrasive grain for the wire saw apparatus of the present invention, the tensile strength ranges 4,000 to 4,800 $N/mm^2$ to be larger than that of a high tensile strength metal wire such as a conventional piano wire. Further, the production cost of the wire 21 having no abrasive grain is inexpensive.

Even further, a moment of inertial is decreased at a time when a running direction of the wire 21 having no abrasive grain of the present invention is turned in the reciprocating type of the wire saw apparatus, a starting speed becomes high, a running speed is increased, and the rigidity of the wire saw apparatus can be low, because the weight of the wire 21 of the present invention is lighter than that of a high tensile strength metal wire having the same size as the wire 21.

Further, in the wire 21 having no abrasive grain for the wire saw apparatus of the present invention, the slicing may be stably performed, because, in comparison with the high tensile strength metal wire, an elongation of the wire 21 is small under the conditions of a temperature difference and a tension fluctuation.

The wire for the wire saw apparatus of the present invention may be also a wire having a binder layer dispersed with abrasive grains for the most outer layer thereof.

Next, a wire for a wire saw apparatus in the third preferred embodiment according to the invention will be explained.

Figure 5B:
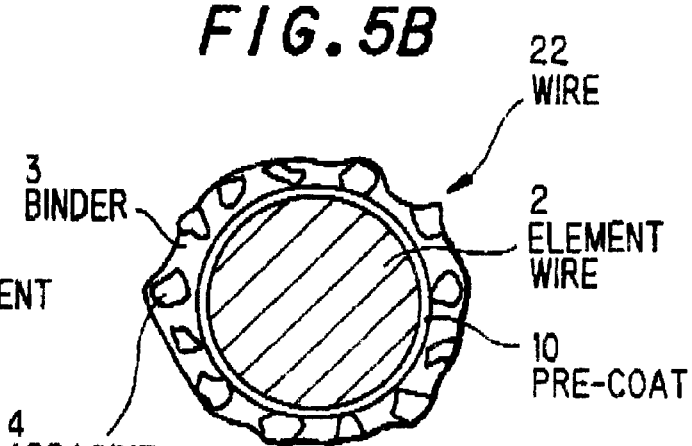
FIG. 5B is a transverse sectional view of a wire for a wire saw apparatus in the third preferred embodiment of the present invention.

In FIG. 5B, a wire 22 for a wire saw apparatus comprises an element wire 2 which is a quartz glass, a pre-coat 10 coated on an outside circumferential surface of the element wire 2, a binder 3 coated on an outside circumferential surface of the pre-coat 10, and abrasive grains 4 dispersed in the binder 3.

The binder 3 is of, for instance, a metal material, an inorganic material such as a glass, an organic material such as a polyamide-imide resin, etc.

The abrasive grains 4 are of, for instance, GC, alumina, silicon carbide, etc.

Next, a method for producing the wire 22 for the wire saw apparatus will be explained.

During mixing a solution made by solving the binder 3 into a solvent, the abrasive grains 4 are dispersed in the solution. The abrasive grains-dispersed solution is coated on an outer surface of the pre-coat 10 of the wire 21. The, the wire 21 coated with the abrasive grains-dispersed solution is baked through a heating furnace, so that the wire 22 having the abrasive grains for the wire saw apparatus is produced.

In the wire 22 having the abrasive grains for the wire saw apparatus of the present invention, the solvent evaporates and dose not exist on the surface of the wire 22 having the abrasive grains for the wire saw apparatus, because the element wire 2 coated with the abrasive grain-dispersed solution made by solving the binder 3 into the solvent is baked. Thus, the binder 3 which is a very thin film is formed on the outer surface of the wire 22 for the wire saw apparatus. Parts of the abrasive grains 4 are exposed from the surface of the binder 3. When the kind and/or thickness of the binder 3 are changed, the abrasive grains 4 may not expose from the surface of the binder 3.

In a loose abrasive grain wafer slice method, even if an instantaneous or partial lack of the abrasive grain slurry is occurred between the wire 22 having the abrasive grains for the wire saw apparatus and an ingot to be sliced (work), the saw mark is not occurred, because the abrasive grains are held on the surface of the wire 22 having the abrasive grains for the wire saw apparatus.

Namely, in comparison with the conventional wire for the wire saw apparatus, the bite of the abrasive grains into the ingot to be sliced is largely increased and the slicing performance is increased, because the abrasive grains 4 on its outer surface of the wire 22 having the abrasive grains for the wire saw apparatus of the present invention and the abrasive grains in the abrasive grain slurry are effective for slicing the work.

Further, the wire 22 having the abrasive grains for the wire saw apparatus of the present invention is able to slice the ingot effectively to provide the wafers even where a tension of the wire 22 is set to be weaker than that of the conventional wire, because the bite of the abrasive grains is good. Thus, a diameter of the wire 21 can be smaller than that of the conventional wire, because the tensile strength may be weak. Therefore, the yield of the wafers is increased by decreasing the kerf loss of the wafer in accordance with the decrease of the diameter of the wire 22.

Even further, in the wire 22 having the abrasive grains for the wire saw apparatus of the present invention, some of the works are able to be sliced dependently on their materials without using the abrasive grain slurry by only lubricating oil which has no abrasive grain. Thus, the process of the wafer slice can be simple, and a dirty process can be largely improved in the environmental hygiene, because the production, maintenance and management of the abrasive grain slurry are not needed or largely decreased.

The bonding force of the binder 3 and the abrasive grains 4 can be changed by selecting the material of the binder 3. Further, the best slicing condition can be obtained by selecting a size of the abrasive grains 4 in accordance with the material of the work to be sliced, the slicing purpose, and/or the slicing condition regarding the speed, the surface roughness, etc. of slicing.

The quartz glass thin wire is used for the element wire 2 of the wire 21 (FIG. 5A) having no abrasive grain and the wire 22 (FIG. 5B) having the abrasive grains in the second and third preferred embodiments according to the invention. Instead, the quartz glass thin wire may be replaced by a bunch of natural quartz glass or high purity synthesis quartz glass fibers, or a stranded wire of the fibers, each of which has a diameter of approximately 20 $\mu$m, for instance.

The wire having the element wire 2 of the fiber bunch or the fiber-stranded wire provides the same advantages as those of the wire having the element wire 2 of the quartz glass thin wire, regardless that it has the abrasive grains or not. As a matter of course, the slicing effectively is expected to be improved due to the multi-fiber structure making a diameter small to maintain a predetermined tensile strength. The structure of the multi-fiber element wire 2 is determined dependently on the material of a work to be sliced, the purpose of slicing the work, the condition of slicing the work, etc.

When two days has passed after the wire 21 having no abrasive grain was produced, Weibull characteristic is examined in the breaking strength for 100 samples of the wire 21.

FIG. 6 is a graph of results of a Weibull characteristic appreciation of a wire having no abrasive grain for a wire saw apparatus of the present invention. In FIG. 6, an ordinate shows a breaking probability (%) and an abscissa shows a tension strength (kgf).

In FIG. 6, plotted points make an approximately straight line in the tension strength of 2.4 kgf. Thus, it is confirmed that the results are satisfactory.

Further the wire having no abrasive grain for the wire saw apparatus is placed in a room for 300 days, and results are obtained to be the same as the above ones.

Namely, after it has been placed in the room for about 300 days, the strength of the element wire 2 is not decreased due to the existence of the Ni pre-coat on the outside circumferential surface of the element wire. Therefore, it is assumed that the Ni pre-coat may prevent the water component in the air form invading into the element wire 2.

Next, silicon carbide abrasive grains of #1,200 having 30 weight ratio are dispersed in and mixed with a polyamide-imide varnish having 100 weight ratio. The mixture is coated on an outer surface of a wire having no abrasive grain for the wire saw apparatus. Then, the wire coated with the mixture is passed through a heating furnace to be baked at 350 to 400° C., so that the wire 22 having abrasive grains for the wire saw apparatus having a diameter of 0.16 mm is produced.

Figure 7:
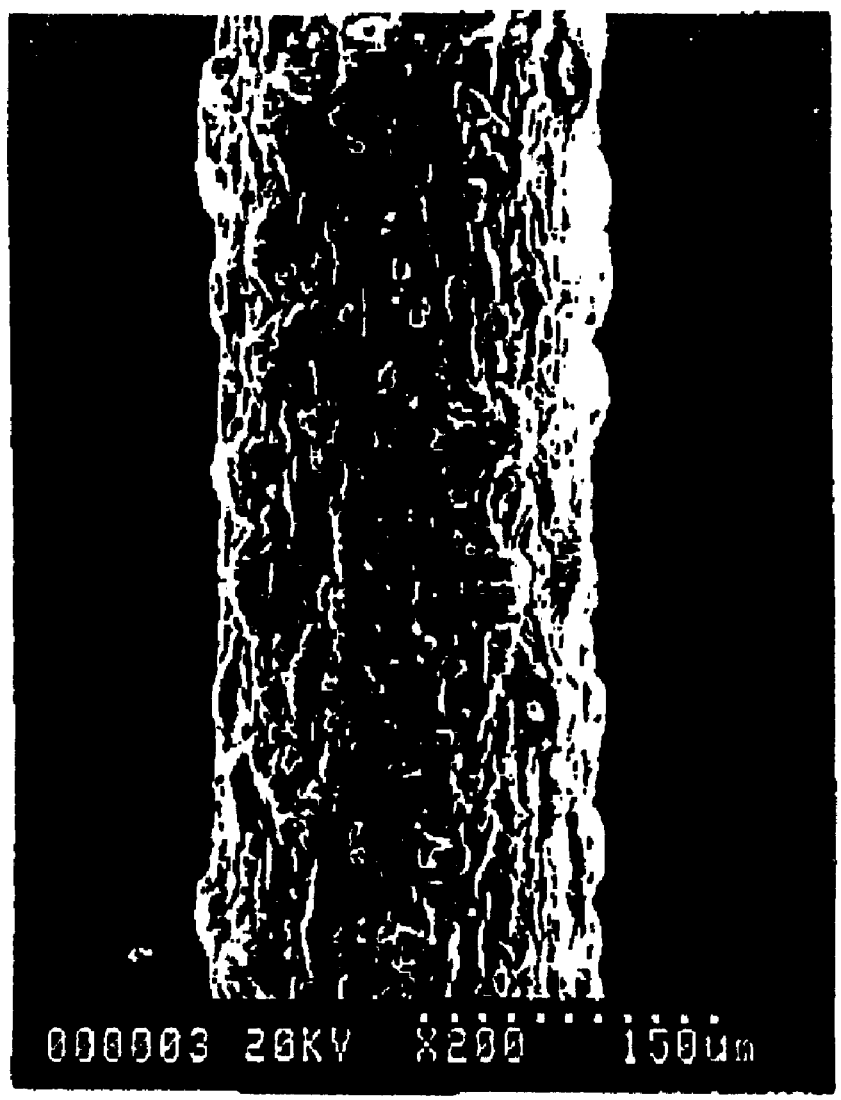
FIG. 7 is a photograph of a surface of a wire for a wire saw apparatus of the present invention observed by a scanning electron microscope.

FIG. 7 is a photograph of a surface of the wire having the abrasive grains for the wire saw apparatus in the third preferred embodiment observed by a scanning electron microscope. The microscope in FIG. 7 has a magnification of 200 times, and one scale in FIG. 7 is 15 $\mu$m.

As shown in FIG. 7, though the outer surface of the wire having the abrasive grains for the wire saw apparatus is coated by the binder, parts of the silicon carbide abrasive grains are exposed from the surface of the binder.

The wire for the wire saw apparatus of the third preferred embodiment is set on a widely used wire saw apparatus, then a gallium arsenic compound semiconductor ingot having the diameter of 106 mm is sliced to provide 31 wafers at one time with only lubricating oil by the wire. In this case, a design value in thickness of the wafer is 2 mm.

The result is that a time of completing the slice of 31 wafers is about half of a time for operation in which a conventional wire is used with injecting the abrasive grain slurry. Thus, it is confirmed that the slicing performance is increased in the invention.

Figure 8:
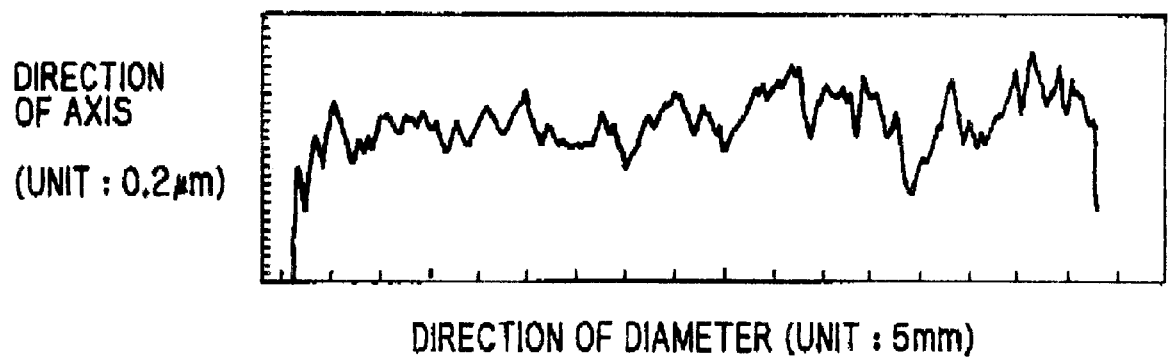
FIG. 8 is a graph of results of measuring a surface roughness of a part of a transverse cross section of a wafer which is sliced by a wire for a wire saw apparatus of the present invention by a roughness measuring unit.

FIG. 8 is a graph of results of measuring a surface roughness of a part of a transverse cross section of the wafer which is sliced by the wire 22 having the abrasive grains for the wire saw apparatus of the present invention. The surface roughness is measured by a roughness measuring unit. The ordinate shows position in the direction of the axis of the wafer, that is, the height of the surface of the wafer (one scale is 0.2 $\mu$m), and the abscissa shows positions in the direction of the diameter of the wafer (one scale is 5 mm).

As shown in FIG. 8, though a maximum surface roughness of a part of the transverse cross section of the wafer is about 4 to 5 $\mu$m and a fluctuation of the surface roughness is larger than of the conventional wire, the fluctuation of the surface roughness can be small by optimizing a size of the abrasive grains and the process condition.

That is, the wafer slice operating time and the surface roughness of the transverse cross section of the wafer can be more improved by combining optimum conditions of the size, configuration, material and quantity of the abrasive grains, the material of the binder, the mixing ratio of the abrasive grains and the binder, the coating thickness of the abrasive grains and the binder, the slice operating condition, the design value in a slicing thickness, and/or the material of the work.

Further, in the wire 21 having no abrasive grain for the wire saw apparatus, the wafer slicing time and the surface roughness of the transverse cross section of the wafer can be more improved to be low in cost of the wire by combining optimum conditions such as the size of an element wire, the material and configuration of the pre-coat. For instance, an ultraviolet hardening type of a resin used for a general communication optical fiber, Cu, etc. may be used for the pre-coat, and Au may be coated on the outside circumferential surface of the Ni pre-coat.

In the above wire for the wire saw apparatus of the present invention, (1) the slicing performance is increased and the slicing time can be short, because the bit of the abrasive grains is largely increased at the wafer slicing; (2) the diameter of the wire can be small, and the slicing yield is increased, because the tensile strength of the wire is able to be low; (3) the process of the wafer slice can be simple, and the environment hygiene of the dirty process can be largely improved, because some of the works are able to be sliced without using the abrasive grain slurry by only lubricating oil which has no abrasive grain; (4) the wire for the wire saw apparatus which is most suited for the material of the work, the slicing condition, and the slicing purpose can be obtained by selecting the size of the abrasive grains and the material of the binder; (5) the tensile strength of the wire is larger than that of the conventional high tensile strength wire, the production cost of the wire is inexpensive, the diameter of the element wire is smaller, and the effectiveness is increased, because the quartz glass or the high purity synthesis quartz glass is used as the material of the element wire; and (6) in the wire comprising no metal, the metal contamination for the sliced wafer can be avoided.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds are therefore intended to embraced by the claims.

What is claimed is:

1. A wire for a wire saw apparatus for slicing a material, comprising:

an element wire;

a binder coated on an outside circumferential surface of said element wire; and abrasive grains dispersed in said binder;

wherein said element wire is a high tensile strength metal wire;

wherein said binder is an organic or inorganic material other than a metal;

wherein said abrasive grains are held on said surface of said element wire by said binder; and wherein said element wire is coated with an abrasive grains-dispersed solution made by solving said binder into a solvent and baking the coated element wire to remove said solvent.

2. The wire for the wire saw apparatus according to claim 1, wherein:

said element wire is either a high tensile strength non-metallic fiber, or a high tensile strength non-metallic fiber bunch, or a high tensile strength non-metallic stranded wire.

3. The wire for the wire saw apparatus according to claim 1 or 2, wherein:

said organic material is polyamide-imide.

4. The wire for the wire saw apparatus according to claim 1 or 2, wherein:

said inorganic material is glass.

5. The wire for the wire saw apparatus according to claim 1 or 2, wherein:

said high tensile strength non-metallic fiber is a carbon fiber or a polyaramide fiber.

6. A wire for a wire saw apparatus for slicing a material, comprising:

an element wire made by a natural quartz glass or a high purity synthesis quartz glass.

7. The wire for the wire saw apparatus according to claim 6, wherein:

said element wire is a thin glass wire.

8. The wire for the wire saw apparatus according to claim 6, wherein:

said element wire is either a fiber, a fiber bunch, or a stranded wire of fibers, each of which is made by said natural quartz glass or said high-purity synthesis quartz glass.

9. The wire for the wire saw apparats according to claim 6 or 8, wherein:

said element wire is coated on an outer surface thereof by one or more materials which are selected from a metal, an organic material, and an inorganic material, whereby a coated layer is formed on said surface of said element wire.

10. The wire for the wire saw apparatus according to claim 9, wherein:

said coated layer has abrasive grains held on a surface thereof by one or more materials which are selected from a metal, an organic material and an inorganic material.

* * * * *